United States Patent [19]

Krechmery

[11] Patent Number: 4,574,640

[45] Date of Patent: Mar. 11, 1986

[54] INTEGRATED DUAL-RANGE PRESSURE TRANSDUCER

[75] Inventor: Roger L. Krechmery, Riverside, Calif.

[73] Assignee: Bourns Instruments, Inc., Riverside, Calif.

[21] Appl. No.: 676,037

[22] Filed: Nov. 29, 1984

[51] Int. Cl.⁴ .............................................. G01L 9/06
[52] U.S. Cl. ...................................... 73/721; 73/727; 338/4; 338/42
[58] Field of Search ............... 73/721, 727, 720, 726, 73/DIG. 4; 338/4, 42, 3

[56] References Cited

U.S. PATENT DOCUMENTS

| | | | |
|---|---|---|---|
| 2,979,680 | 4/1961 | Bean, Jr. | 338/5 |
| 3,088,323 | 5/1963 | Welkowitz et al. | 73/727 |
| 3,484,732 | 12/1969 | Postma | 338/4 |
| 4,222,277 | 9/1980 | Kurtz et al. | 73/721 |
| 4,322,980 | 4/1982 | Suzuki et al. | 73/727 |
| 4,395,915 | 8/1983 | Singh | 73/720 |

FOREIGN PATENT DOCUMENTS 0746221  7/1980  U.S.S.R. ............... 73/720

Primary Examiner—Donald O. Woodiel
Attorney, Agent, or Firm—Howard J. Klein; William G. Becker

[57] ABSTRACT

A pressure transducing device in the form of a beam includes a monolithic chip of silicon or similar material which is mechanically supported at and near its two opposed ends and unsupported in a flexible region between the two ends. The flexible, unsupported region is one of maximized sensitivity to stresses produced by deflection or flexing of the beam due to, e.g., a differential pressure applied across it. An integral, pressure-responsive diaphragm is formed in the supported area of the chip near one of its mechanically-supported ends. This area of the chip is relatively insensitive to stresses produced by beam flexing or deflection; rather, it responds to stresses produced by a pressure (e.g., a static pressure) applied directly to its surface. A first set of strain gauges is provided in the flexible chip region, and a second set on the surface of the integral diaphragm. Thus, a single transducing element is formed which provides separate output signals simultaneously indicative of both differential and static pressures experienced by, respectively, the unsupported chip region and the surface of the integral diaphragm.

28 Claims, 4 Drawing Figures

U.S. Patent  Mar. 11, 1986  4,574,640
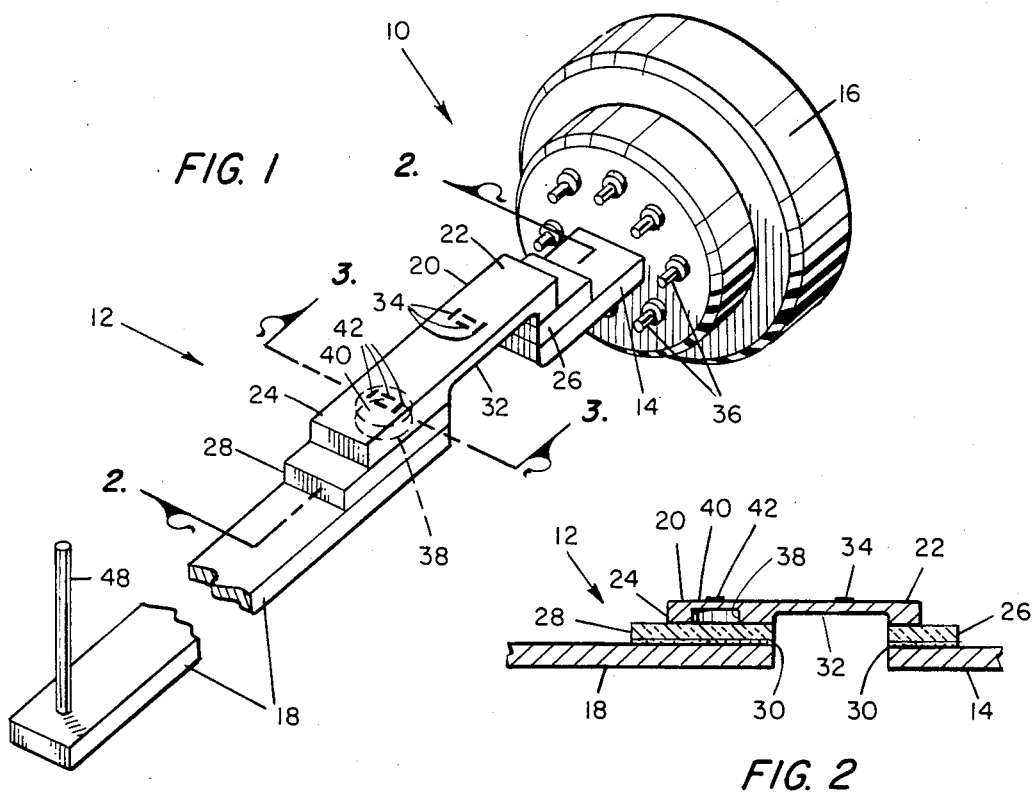
FIG. 1
FIG. 2
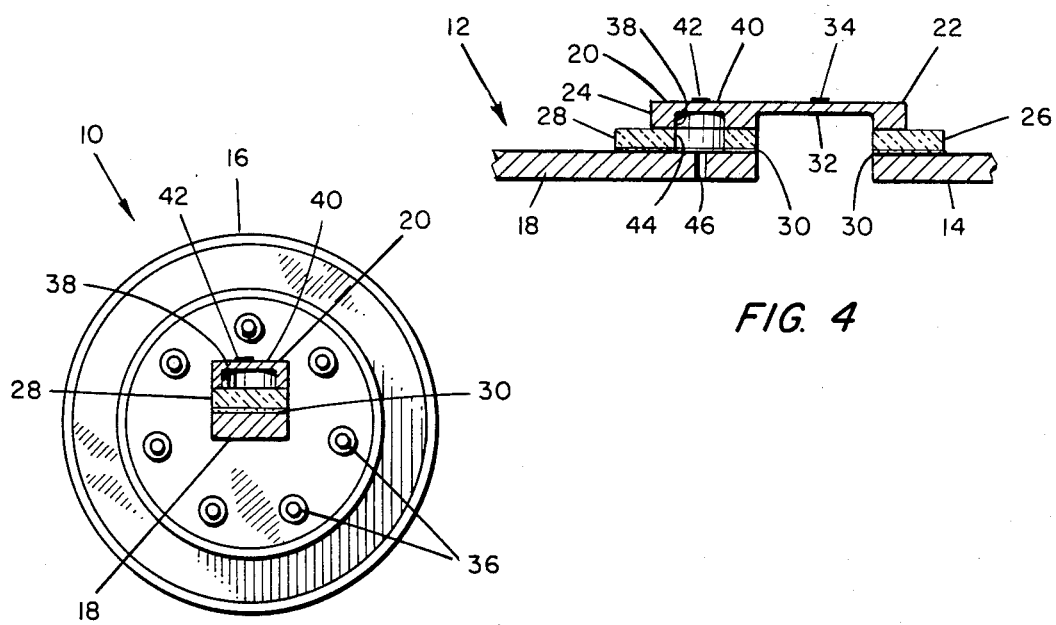
FIG. 3
FIG. 4

INTEGRATED DUAL-RANGE PRESSURE TRANSDUCER

BACKGROUND OF THE INVENTION

This invention relates generally to the field of pressure sensing or pressure transducing devices. In particular, it relates to the class of such devices in which a pressure-responsive element is provided with solid-state strain gauges that produce an electrical output signal indicative of the pressure applied to the pressure-responsive element. More specifically, the present invention relates to a transducer of the aforementioned type which can simultaneously measure pressures in two different pressure ranges, or pressures of two different types (i.e., static pressure as well as differential pressure).

Fluid pressure transducers are commonplace in many industrial applications. Such transducers are employed, for example, to measure the differential pressure of a process fluid flowing through or past an orifice, nozzle, or other fluid flow discontinuity. It is also frequently desirable to measure the static pressure of the fluid at the same time. Instead of employing two separate transducers, the industry has widely adopted pressure-measuring instruments which combine, in a single instrument, both static and differential pressure transducing capabilities. An example of such an instrument is disclosed and claimed in U.S. Pat. No. 4,395,915 to Singh, commonly assigned with the present application. In the Singh device, differential pressure is measured by a pressure-responsive beam, while static pressure is measured by a separate, discrete diaphragm. Both the beam and the diaphragm are provided with piezoresistive strain gauges to produce appropriate pressure-indicative output signals.

Other instruments have been devised to measure, simultaneously, gauge pressure and absolute pressure. Examples of such devices are found in U.S. Pat. No. 4,222,277 to Kurtz et al. and U.S. Pat. No. 4,322,980 to Suzuki et al. Instruments of this type are characterized by a pair of discrete diaphragms formed in a single semiconductor wafer, each of the diaphragms being provided with its own set of strain gauges.

In U.S. Pat. No. 3,484,732 to Postma, a pressure measuring instrument is disclosed which is capable of pressure measurements in two different ranges. Low range pressures are measured by strain gauges provided on a hollow, rectangular frame, while strain gauges on a compression block measure high range pressures.

Thus, two basic types of dual-function pressure transducers have been provided by the prior art: The first type, exemplified by the Singh and Postma patents, uses separate and discrete pressure-responsive members to provide simultaneous static and differential pressure measurements (Singh) or dual-range pressure measurements (Postma). The second type, exemplified by the Kurtz et al. and the Suzuki et al. patents, uses a pair of pressure-responsive members formed from a single, unitary element (a wafer) to provide both gauge and absolute pressure measurements. This second type, however, is not totally satisfactory for applications involving measurements of pressures in lower pressure ranges, since lower pressures require relatively large diaphragms that can be fairly expensive to manufacture and cumbersome to package in a practical instrument. Thus, instruments designed to measure relatively small differential pressures, or low range static pressures, must have some other form of pressure-responsive element (i.e., a beam or a hollow frame) to provide such measurements.

Besides low pressure range capability, another advantage of beam-type instruments, of the construction exemplified by the aforementioned patent to Singh, is that isolation of the beam and its associated strain gauges from the measured fluid medium is provided. This isolation avoids problems of chemical incompatibility between the medium on the one hand, and the beam and/or its strain gauges on the other hand.

Thus, it would be a great advance in the art to provide a pressure measuring instrument which combines the fluid medium isolation and low pressure range capabilities of the beam-type of instrument, with the structural simplicity of the integral dual-diaphragm type of instrument.

SUMMARY OF THE INVENTION

Broadly, the invention is an improved beam-type pressure transducing device, wherein the beam has a monolithic pressure-responsive element. The pressure-responsive beam element has a first pressure-responsive region in a structurally unsupported area that is subject to pressure-induced flexing, and a second, separate, pressure-responsive region in a structurally supported area of the beam element that is subject to pressure-induced strain, but not to flexing. Each pressure-responsive region of the beam element is provided with its own array of strain-sensitive elements (strain gauges), with the strain gauges in each region producing an output signal that is proportional to the pressure-induced strain in that region. Each of the two (or more) pressure-responsive regions in the beam element is responsive to pressures in a different range, so that simultaneous measurements of high- and low-range pressures can be made.

In a specific embodiment of the invention, the monolithic beam element has an unsupported region subject to pressure-induced flexing, and a structurally-supported region which is not subject to such flexing. In the supported region, a recess is formed in one side of the beam element to define a pressure-responsive surface on the opposite side of the beam element. This pressure-responsive surface is, in effect, a pressure-responsive diaphragm that is formed as an integral part of the beam element. A first set of strain gauges is provided in the unsupported region of the beam element, and produces an output signal which is proportional to the pressure which induces a flexing of the unsupported region. This pressure may be, for example, a differential pressure, of relatively low magnitude. A second set of strain gauges is disposed on the diaphragm region of the beam element, and produces an output signal which is proportional to the pressure applied to the diaphragm. This latter pressure may be, for example, a static pressure, of relatively high magnitude (as compared to the differential pressure).

The diaphragm is structurally isolated from the unsupported, flexible region of the beam element, so that the diaphragm is not strained or stressed by the flexing of the beam element in its unsupported region. Thus, the output signal of the diaphragm's strain gauges is unaffected by the beam's flection, thereby allowing accurate measurement of the static pressure applied to the diaphragm.

Again referring to a specific embodiment, the recess forming the diaphragm is covered by a support element to which the beam element is attached in its structurally-supported region, thereby forming an enclosed chamber behind or beneath the pressure-responsive surface of the diaphragm. This chamber is supplied with a reference pressure with respect to which the applied pressure is measured. For example, if the chamber substantially evacuated, the applied pressure is measured as an absolute pressure. If the chamber is vented to the atmosphere, the applied pressure is measured as gauge pressure.

As will be more fully appreciated from the detailed description which follows, the present invention offers the unique advantage of providing a dual-pressure range capability in a structurally simple device that further includes the desirable characteristics of a beam-type of instrument. Specifically, the present invention, by incorporating a pressure-responsive diaphragm as an integral part of a pressure-responsive beam element, provides a beam-type instrument with dual-pressure range capability without the need for a separate, discrete diaphragm, as is required by the instrument of the aforementioned Singh patent. Thus, the advantages of a beam-type instrument are fully retained: the ability accurately to measure relatively low pressures, and the isolation of the pressure-sensitive elements from the measured fluid medium. In addition, the resulting simplicity of structure provides the further advantages of lower fabrication costs, reduced size, and improved reliability as compared with prior art dual-range instruments.

BRIEF DESCRIPTION OF THE DRAWINGS

FIG. 1 is a perspective view of a pressure sensing device constructed in accordance with a preferred embodiment of the invention;

FIG. 2 is a longitudinal cross-sectional view taken along line 2—2 of FIG. 1;

FIG. 3 is a transverse cross-sectional view taken along line 3—3 of FIG. 1; and

FIG. 4 is a longitudinal cross-sectional view, similar to FIG. 2, but showing a modified form of the preferred embodiment of the invention.

DETAILED DESCRIPTION OF THE INVENTION

Referring first to FIGS. 1, 2, and 3, a pressure sensing device 10 in accordance with a preferred embodiment of the invention is illustrated. The device 10 comprises a multi-part beam 12. The beam 12 has a proximal metal portion 14 cantilevered from a support structure such as the bottom of a header 16, and a distal metal portion 18 spaced from the first metal portion and connected thereto by a monolithic beam element in the form of a silicon chip 20. The chip 20 is substantially rectangular in plan view and in cross-section, and it is attached at its proximal and distal ends 22, 24, respectively, to the proximal and distal metal beam portions 14 and 18 by means of proximal and distal glass mounting pads 26 and 28, respectively. The chip 20 is attached to the pads 26 and 28 preferably by anodic bonding (as disclosed in, e.g., U.S. Pat. No. 3,397,278), and the pads themselves are bonded to the beam portions 14 and 18 by a suitable epoxy bonding agent 30. The preferred material for the beam portions 14 and 18 is 42 Nickel-Iron, but 17-4 or 17-7 stainless steel may also be used. The mounting pads are preferably made of 7740 Pyrex glass or the equivalent.

The pads 26 and 28 provide what may be termed a "graded thermal joint" between the chip 20 and the metal beam portions 14 and 18. In other words, the glass of the pads has a coefficient of thermal expansion intermediate those of the metal portions of the beam and of the chip, thereby reducing thermal stresses on the chip. In addition, the pads mechanically support the ends 22 and 24 of the chip and isolate these supported ends from mechanical stresses resulting from pressure-induced bending of the beam 12.

As best shown in FIG. 2, the chip 20 has an unsupported area 32 of reduced thickness between its two supported ends. This unsupported area 32 is produced by etching the bottom or inner surface of the chip by a conventional silicon etching technique. With its reduced thickness, the unsupported area 32 is flexible, and it is thus sensitive to stresses produced by pressure-induced flexing or deflection of the beam 12. A first plurality of strain-sensitive elements is disposed on the outer or upper surface of the unsupported area 32.

If the chip 20 is made of N-type silicon, the strain-sensitive elements would be, preferably, P-type silicon resistive elements diffused into the chip to provide piezoresistive strain gauges 34, configured in, preferably, a full Wheatstone bridge circuit. The strain gauges 34 are connected by wires (not shown) to terminals 36 on the underside of the header 16. The terminals 36 extend through to the other side of the header 16 for electrical connection to appropriate signal processing circuitry (not shown).

As discussed above, the ends 22 and 24 of the chip 20 are supported on glass pads 26 and 28, respectively. The unsupported area 32 of the chip is closer to the proximal end 22 thereof, so that the chip has a substantial area supported on the distal pad 28. A recess 38 is formed in the bottom or inner surface of the chip in the supported area near its distal end 24. The recess 38 is formed by conventional silicon etching techniques, and it extends only partway through the chip. By way of specific example, for a chip having a thickness of about 20 mils in the area supported by the pad 28, the recess would extend into the chip a distance of about 10 to 15 mils. The recess 38 would thus define a pressure-responsive diaphragm 40, of a thickness of about 5 to 10 mils, and with an upper or outer surface that is integral and substantially coplanar with the upper or outer surface of the chip 20.

The diaphragm 40 is provided with a second set of strain-sensitive elements such as diffused P-type silicon piezoresistive strain gauges 42 arranged in a full Wheatstone bridge circuit. The strain gauges 42 are, like the first set of strain gauges 34, connected by wires (not shown) to header terminals 36. Because the diaphragm 40 is in an area of the chip 20 that is supported against flexing by the distal pad 28 and the distal metal beam portion 18, the diaphragm is relatively insensitive to stresses induced by beam flexing or deflection. Rather, the diaphragm is responsive substantially only to stresses induced by pressures applied directly to its outer surface.

As shown in FIGS. 2 and 3, the recess 38 is completely sealed by the distal glass pad 28 to form an enclosed chamber. If this chamber is substantially evacuated (such as by bonding the chip 20 to the pad 28 in a vacuum), the strain gauges 42 will produce a signal indicative of the absolute pressure applied to the diaphragm 40.

Alternatively, as shown in FIG. 4, the interior chamber defined by the recess can be open to the ambient atmosphere through apertures 44 and 46 in the pad 28 and the metal beam portion 18, respectively. This configuration can be achieved by drilling the aperture 46 in the metal beam portion 18, and by etching the pad aperture 44 and the chip recess 38 in one step after the chip is bonded to the pad, and before the pad is bonded to the beam portion 18. With this configuration, the strain gauges 42 on the diaphragm 40 produce an output signal indicative of gauge pressure applied to the diaphragm's surface.

The invention described above and in the drawings is advantageously employed as the pressure-sensing or transducing element in a pressure measuring device of the type disclosed in U.S. Pat. No. 4,345,476 to Singh, which is commonly assigned with the present application, and the disclosure of which is expressly incorporated herein by reference. In such a pressure measuring device, the entire beam 12 is disposed within an enclosed chamber filled with an incompressible liquid, such as oil. The chamber is situated in a housing having a pair of pressure ports for inputting a differential pressure (to be measured) across the device. A pressure-sensing diaphragm associated with each of the pressure input ports transmits the pressure received in each of the ports as follows: A first such diaphragm, associated with the low pressure input port, is connected directly to the beam 12 by a strut wire 48 (FIG. 1). Thee other pressure sensing diaphragm, associated with the high pressure input port, is not directly coupled to the beam; rather, the high-side pressure is transmitted to the beam through the incompressible liquid medium.

The pressure differential between the two input ports results in a flexing or deflection of the beam. Since the unsupported area 32 of the chip 20 constitutes that portion of the beam of maximum sensitivity to the stresses induced by such deflection or flexing, the strain gauges 34 located on the unsupported chip area 32 produce an output signal which is accurately proportional to the magnitude of such stresses, and, therefore, also to the differential pressure producing the stresses.

The integral pressure-responsive diaphragm 40, on the other hand, is on a portion of the beam which is supported against flexing by the distal beam member 18 and by the distal mounting pad 28. Therefore, the diaphragm 40 is relatively insensitive to the stresses induced by beam flexing or deflection. Rather (assuming the beam is oriented so that the outer surface of the diaphragm 40 is impinged upon by the incompressible liquid transmitting pressure from the high pressure input port), the diaphragm 40 receives, and is stressed by, the pressure transmitted by the incompressible liquid from the sensing diaphragm at the high pressure input port. Thus, the strain gauges 42 on the diaphragm 40 produce an output signal which is proportional to the static pressure applied to the diaphragm 40 from the high pressure input port.

It will be appreciated from the foregoing that the beam 12 (or, more specifically, the chip 20) has two pressure-responsive regions: the unsupported chip area 32, which is sensitive substantially only to stresses resulting from differential pressure-induced flexing or deflection of the beam; and the diaphragm 40, which is sensitive substantially only to stresses resulting from the application of a static pressure to its surface. As previously mentioned, the diaphragm can be configured to measure absolute pressure (using an enclosed and evacuated chamber formed by the recess 38, as shown in FIG. 2), or gauge pressure (when the recess 38 is receptive to ambient or a predetermined reference pressure, as shown in FIG. 4).

It will also be appreciated that the unsupported flexible chip area 32 and the diaphragm 40 are responsive to pressures in different (although possibly overlapping) ranges. Specifically, the differential pressures sensed in the unsupported chip region 32 will be lower in magnitude than the static pressures sensed by the diaphragm 40.

Several advantages are achieved by the present invention, and particularly by its use of a single, integral transducing element that is separately and simultaneously responsive to both static and differential pressures. Most apparently, the resulting simplicity in design and construction affords significant cost savings in manufacturing as compared with pressure measuring devices (such as in the aforementioned U.S. Pat. No. 4,395,915 to Singh) that require a separate sensing or transducing element for measuring static and differential pressures. Similarly, by reducing the structure associated with a separate, discrete static pressure sensor, a smaller, more compact pressure measurement device can be produced, an important consideration in applications (such as aerospace instrumentation) where reduced size and weight are desirable. With fewer active components than many prior art designs, higher reliability is also achieved, while the design of the present invention also allows a high degree of uniformity from instrument to instrument. These advantages are achieved together with the other advantages attributed to beam-type pressure measuring instruments: sensitivity to relatively low pressures (important in measuring differential pressures); and isolation of the strain gauges from the measured fluid medium.

Although a preferred embodiment of the invention has been disclosed, various modifications will suggest themselves to those skilled in the pertinent arts. For example, instead of a silicon chip with diffused strain gauges, a chip or substrate of monocrystalline aluminum oxide (e.g., sapphire) with epitaxially-deposited silicon strain gauges may be used. With an aluminum oxide substrate, the recess 38 may be formed by ultrasonic machining. Alternatively, a metallic plate or substrate, with thin film or foil strain gauges, might be considered. Such a construction might obviate the need for the mounting pads 26 and 28, since the beam 12 would be formed of components having comparable thermal characteristics.

Another modification would be the use of two or more integral diaphragms 40 for redundant pressure sensing or other purposes. The multiple diaphragms could be formed in either or both of the supported ends 22 and 24 of the chip 20.

These and other modifications which might suggest themselves should be considered within the spirit and scope of the present invention, as defined in the claims which follow.

What is claimed is:

1. A pressure transducing device, comprising:
   a beam element having a first region which is sensitive to stresses produced by flexing of the beam element and a second region which is relatively insensitive to such stresses;

a pressure-responsive diaphragm formed in said second region of said beam element;

first sensing means, disposed on said first region of said beam element, for sensing the stresses induced therein by the flexing of said beam element; and second sensing means, disposed on said diaphragm, for sensing the stresses induced in said diaphragm in response to a pressure applied thereto.

2. The device of claim 1, wherein said beam element has first and second opposed surfaces, and wherein said diaphragm has an outer surface integral with said first surface of said beam element and an inner surface defined by a recess in said second surface of said beam element.

3. The device of claim 2, further comprising:

a support element attached to said second surface of said beam element in said second region thereof and defining, with said recess, an enclosed chamber underlying said diaphragm.

4. The device of claim 3, wherein said enclosed chamber is substantially evacuated so that said diaphragm is responsive to the absolute pressure applied to its outer surface.

5. The device of claim 1, wherein said beam element has first and second ends respectively supported against flexing by first and second support elements, and wherein said first region is an unsupported portion of said beam element disposed between said first and second ends.

6. The device of claim 5, wherein said unsupported portion of said beam element includes a reduced-thickness area wherein sensitivity to flexing-induced stresses is maximized.

7. The device of claim 1, wherein said first sensing means includes a first plurality of strain gauges responsive to the flexing-induced stresses in said first region of said beam element and producing a first output signal proportional to said flexing, and wherein said second sensing means includes a second plurality of strain gauges responsive to the pressure-induced stresses in said diaphragm and producing a second output signal proportional to said pressure.

8. The device of claim 7, wherein said diaphragm is responsive to a pressure differential applied across it, and wherein said second output signal is proportional to said pressure differential.

9. The device of claim 7, wherein said beam element is formed of silicon, said strain gauges are piezoresistive elements diffused into said beam element, and said diaphragm is formed by etching a recess into one side of said beam element within said second region.

10. The device of claim 7, wherein said beam element is formed of monocrystalline sapphire, said strain gauges are silicon piezoresistive elements epitaxially deposited on a first surface of said beam element, and said diaphragm is formed by an ultrasonically machined recess in a second side of said beam element opposed to said first side and within said second region.

11. The device of claim 1, wherein said beam element is flexed by the application thereto of pressures within a first pressure range, and wherein said diaphragm is responsive to pressures within a second pressure range different from said first pressure range.

12. A pressure transducing device, comprising:

a beam element having a supported region and an unsupported region, said unsupported region being relatively sensitive to stresses induced by the flexing of said beam element in response to pressure applied thereto;

a pressure-responsive diaphragm formed integrally with said beam element in said supported region;

a first plurality of strain gauges, disposed on said unsupported region of said beam element, responsive to the stresses induced in said unsupported region by the flexing of said beam element, and producing a first output signal proportional to the flexing of said beam element; and a second plurality of strain gauges, disposed on said diaphragm, responsive to the pressure-induced stresses in said diaphragm and producing a second output signal proportional to the pressure applied to said diaphragm.

13. The device of claim 12, wherein said beam element is flexed by the application thereto of pressures within a first pressure range, and wherein said diaphragm is responsive to pressures within a second pressure range different from said first pressure range.

14. The device of claim 12, wherein said beam element has a first side and a second side, and wherein said diaphragm has an outer surface integral with said first side, and an inner surface defined by a recess in said second side of said beam element within said supported region.

15. The device of claim 14, further comprising:

a support member attached to said second side of said beam element in said supported region, said support member and said recess defining an enclosed chamber underlying said diaphragm.

16. The device of claim 15, wherein said chamber is substantially evacuated, so that said diaphragm is responsive to the absolute pressure applied to its outer surface.

17. The device of claim 12, wherein said supported region is a first supported region, said device further comprising:

a second supported region separated from said first supported region by said unsupported region.

18. The device of claim 17, further comprising:

first and second support elements respectively attached to said first and second supported regions to minimize the flexing of said beam element in said first and second supported regions.

19. The device of claim 18, wherein said beam element is formed of silicon, said first and second support elements are formed of glass, and said beam element is attached to said support elements by anodic bonding.

20. The device of claim 17, wherein said unsupported region of said beam element includes a reduced-thickness region wherein sensitivity to flexing-induced stresses is maximized.

21. A pressure transducing device of the type including a beam having a monolithic, pressure-responsive beam element, said beam element having a flexible, pressure-responsive region and a plurality of strain-sensitive elements in said flexible region, said strain-sensitive elements being responsive to the pressure-induced stresses in said flexible region and producing an output signal proportional to the pressure inducing such stresses, wherein the improvement comprises:

a second pressure-responsive region in said monolithic beam element; and a second plurality of strain-sensitive elements in said second pressure-responsive region responsive to the pressure-induced stresses in said second pressure-responsive region and producing a second output signal proportional to the pressure which is inducing the stresses in said second pressure-responsive region;

wherein said flexible pressure-responsive region is responsive to pressures within a first pressure range and said second pressure-responsive region is responsive to pressures within a second pressure range different from said first pressure range.

22. The device of claim 21, wherein said flexible pressure-responsive region is a region of relatively high sensitivity to pressure-induced flexing of said beam element, and wherein said second pressure-responsive region is a region of relative insensitivity to such flexing.

23. The device of claim 22, wherein said plurality of strain-sensitive elements in said flexible region is a first plurality which is responsive substantially only to stresses in said flexible region resulting from said pressure-induced flexing, and wherein said second plurality of strain-sensitive elements is responsive substantially only to the pressure-induced stresses in said second pressure-responsive region.

24. The device of claim 23, wherein said second pressure-responsive region comprises a diaphragm formed integrally with said monolithic beam element and having a pressure-responsive surface which is integral with a major surface of said monolithic beam element.

25. The device of claim 24, wherein said monolithic beam element has first and second opposed major surfaces, and wherein said diaphragm is defined by a recess in said second major surface.

26. The device of claim 25, further comprising:
a support element attached to said monolithic beam element so as to underly said diaphragm, thereby defining, with said recess, an enclosed chamber.

27. The device of claim 26, wherein said chamber is substantially evacuated, so that said diaphragm is responsive to the absolute pressure applied to its pressure-responsive surface.

28. The device of claim 26, wherein said support element is a first support element, and wherein said device further comprises:
a second support element attached to said monolithic beam element at an area separated from the attachment area of said first support element by said flexible region of said monolithic beam element.

* * * * *